United States Patent [19]

Chung

[11] Patent Number: 4,812,529
[45] Date of Patent: Mar. 14, 1989

[54] POLYALCOHOL HOMOPOLYMERS

[75] Inventor: Tze-Chiang Chung, Bridgewater, N.J.

[73] Assignee: Exxon Research & Engineering Co., Florham Park, N.J.

[21] Appl. No.: 520

[22] Filed: Jan. 5, 1987

[51] Int. Cl.⁴ .............................................. C08F 8/00
[52] U.S. Cl. ................................. 525/326.1; 525/369; 526/72
[58] Field of Search ....................... 526/72; 525/326.1

[56] References Cited

U.S. PATENT DOCUMENTS

| | | | |
|---|---|---|---|
| 2,469,288 | 5/1949 | Adelson et al. | 526/72 |
| 2,541,155 | 2/1951 | Dannenberg et al. | 526/72 |
| 3,666,740 | 5/1972 | Kargin et al. | 526/72 |
| 3,879,328 | 4/1975 | Jones | 526/72 |
| 4,038,326 | 7/1977 | Koper | 526/72 |

OTHER PUBLICATIONS

"Solubility Parameter Valves of Hydroxy Polymers...", H. Ahmad, J. Oil Colour Chem. Assoc., 63(7), 263–270, 1980.

"Functional Monomers", Ed. Yocum et al., Marcel DeKKer Inc., New York, 1973, pp. 384–387, 439 and 440.

Primary Examiner—Joseph L. Schofer
Assistant Examiner—Bernard Lipman
Attorney, Agent, or Firm—Richard E. Nanfeldt

[57] ABSTRACT

A polyalcohol homopolymer having the formula:

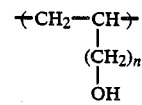

wherein n is about 3 to about 10.

2 Claims, No Drawings

POLYALCOHOL HOMOPOLYMERS

FIELD OF THE INVENTION

The present invention relates to polyalcohol homopolymers having the formula:

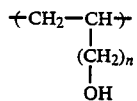

wherein n is about 3 to about 10. These polyalcohol homopolymers are useful in thin film applications for the packaging industry.

BACKGROUND OF THE INVENTION

Thin film composites of polyethylene, a copolymer of ethylene propylene and polyvinyl alcohol have found extensive use in the food packaging industries for meats, vegetables and fruits. The polyvinyl alcohol of these composite films imparts the necessary barrier properties to the composite. The polyethylene imparts the necessary physical properties to the film composite to enable one to have an integral film system. The ethylene/propylene copolymer acts as a binding agent between the ethylene and the polyvinyl alcohol.

The present invention teaches the use of a thin film of a polyalcohol homopolymer for use in the food packaging industry. The use of the polyalcohol homopolymer eliminates the need for the use of film composites because the polyalcohol homopolymer besides exhibiting excellent thermal stability and barrier properties also possesses physical properties which permit the formation of polymeric thin film having sufficient physical integrity.

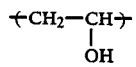

Polyalcohol like polyvinyl alcohol, are well known useful materials prepared via free radical polymerization of vinyl acetate followed by hydrolysis to polyvinyl alcohol. Such polyalcohols always contain unreacted acetate residues. Also, since the alcohol group is attached directly to the backbone such polymers do not particularly have high thermal stabilizers.

Direct polymerization of alcohol containing monomers, although desirable, is synthetically difficult to achieve. One reason for this situation is that alcoholic functionalities poison organometallic catalysts, like Ziegler-Natta (Al, Ti) catalysts.

Copolymers of alpha-olefins (e.g., ethylene and propylene) with special alcohol monomers, e.g., undecylenyl alcohol, have been reported by Clark [U.S. Pat. No. 3,492,277 (1979)] be pretreating the alcohol with organoaluminum compounds. However, this patent does not teach or suggest polyalcohol homopolymers.

SUMMARY OF THE INVENTION

This present invention relates to a process for forming a polyalcohol homopolymer having the formula:

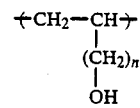

wherein n is about 3 to about 10.

The polyalcohol homopolymer of the instant invention are useful as thin films for the packaging industries. Additionally, the polyalcohol homopolymer can be formed by an extrusion process into a flexible bottle for use in packaging liquid materials.

GENERAL DESCRIPTION OF THE INVENTION

The present invention relates to a process for the synthesis of polyalcohol homopolymers which can be used as a thin film in the food packaging industry or in the formation of flexible bottles for packaging liquid materials.

The process for synthesizing the polyalcohol homopolymers comprises dissolving a polyborane homopolymer in a solvent such as tetrahydrofuran to form a polymeric solution; injecting a sodium hydroxide solution into the polymeric solution at about 25° C.; injecting a hydrogen peroxide solution into the polymeric solution at about 0° C. to about 25° C.; heating the polymeric solution to a temperature of about 45° C. to about 55° C. and maintaining the polymeric solution at about 45° C. to about 55° C. for at least about 2 hours to convert the polyborane homopolymer to the polyalcohol homopolymer; cooling the polymeric solution to room temperature; and adding an aliphatic hydrocarbon such as hexane to the polymeric solution to precipitate the polyalcohol homopolymer from the polymeric solution.

The polyalcohol homopolymers of the instant invention have the formula:

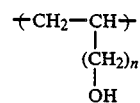

wherein n is about 3 to about 10, more preferably about 3 to about 9 and most preferably about 3 to about 8. The number average molecular weight of the polyalcohol homopolymers as measured by GPC is about 10,000 to about 5,000,000, more preferably about 50,000 to about 4,000,000, and most preferably about 30,000 to about 3,000,000. The molecule structure of the unoriented polyalcohol hompolymer is partial crystallinity which is related to the syndiotactic propagation during Ziegler-Natta polymerization.

The polyborane homopolymers used in the synthesis of the polyalcohol homopolymers have the formula:

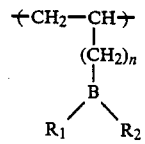

wherein n is about 3 to about 10, more preferably about 3 to about 9 and most preferably about 3 to about 8 and $R_1$ and $R_2$ are the same or different alkyl or cycloalkyl groups having about 1 to about 10 carbon atoms such as 9-boranecyclo [3,3,1] nonane.

The polyborane homopolymers are formed by a Ziegler-Natta polymerization of a borane monomer such as B-7-octenyl-9-BBN, B-5-hexenyl-9-BBN or B-4-pentenyl-9-BBN. To the Ziegler-Natta catalyst of TiCl$_3$.AA, and Al(ET)$_2$Cl and toluene under an inert atmosphere such as argon or nitrogen at room temperature is added the borane monomer. The mixture of Ziegler-Natta catalyst and borane monomer is stirred at room temperature for at least 2 hours until the mixture becomes viscous. The polymerization reaction is terminated by the addition of an aliphatic alcohol. The precipitate of the polyborane homopolymer is washed with additional aliphatic alcohol and subsequently vacuum dried.

The borane monomers are prepared by reacting under an inert atmosphere at room temperature 1,5-hexadiene, 1,4-pentadiene or 1,7-octadiene with a solution of 9-BBN-THF for at least about 1 hour. The unreacted diene and solvent are recovered from the reaction solution by reducing the pressure. The formed borane monomer is recovered by distilling at elevated temperature and reduced pressure.

The thin polymeric films of the polyalcohol homoplymer are at least 5 $\mu$m mils thick. These polymeric films are casted from n-propanol solution which contains about 5 weight percent of polyalcohol. The polymer film exhibits high thermal stability. The major decomposition takes place above 450° C., which is quite different from polyvinyl alcohol. Polyvinyl alcohol starts to dehydrate at about 170° C. These results obviously suggest that the primary alcohol in our polymer is more thermally stable than secondary alcohol in polyvinyl alcohol.

DESCRIPTION OF THE PREFERRED EMBODIMENTS

The following examples illustrate the present invention, without, however, limiting the same hereto.

EXAMPLE 1

Preparation of Monomer, B-7-Octenyl-9-BBN

A dry 500 ml flask was equipped with a magnetic stirring bar and a connecting tube leading to a nitrogen source. The flask was thoroughly flushed with nitrogen before the injection inlet was capped with a rubber serum stopple. A slight positive pressure of nitrogen was maintained thereafter. The flask was charged via syringe with 60 ml 1,7-octadiene. To the stirred diene solution was then added (via syringe) 200 ml of the 0.5M 9-BBN-THF solution. Sufficient time was allowed to ensure complete reaction, then the solvent and unreacted diene were recovered by reducing pressure. B-octenyl-9-BBN monomer (19.4 g, 84%) was distilled at 140° C. under 10 m pressure. Spectroscopic evidences by ZR and H'NMR spectra confirmed the expected molecular structure of monomer. IR: 3,070 cm$^{-1}$ (C=CH$_2$ stretching), 2,850–2,925 cm$^{-1}$ (C-H stretching), 1,807 cm$^{-1}$ (overtone), 1,640 cm$^{-1}$ (C=C stretching), 1,440 cm$^{-1}$ (Ch$_2$ bending), 1,370 cm$^{-1}$ (CH$_2$ wagging), 905 cm$^{-1}$ (CH$_2$=CH bending), 720 cm$^{-1}$ (CH$_2$ rocking). 'H NMR: $_1$=4.9–5.2 ppm (CH$_2$=C terminal), $_2$=5.6–6.2 ppm (-CH=C), $_3$=1.5–1.9 ppm (CH$_2$), intensity ratio. $_1$: $_2$: $_3$=2:1:26.

EXAMPLE 2

Preparation of Monomer, B-5-Hexenyl-9-BBN

Following the procedure of Example 1, 190 ml (1.6 mole) of 1.5-hexadiene was reacted with 800 ml (0.5M) of 9-BBN/THF solution. The reaction was affected with constant stirring at room temperature. After a period of 3 hours, excess 1,5-hexadiene and THF solvent were stripped by vacuum pumping at room temperature. Pure B-5-hexenyl-9-BBN (54 g) was obtained by distillation at 130° C. with low pressure 10 m. The monomer was characterized by IR spectrum.

EXAMPLE 3

Preparation of Monomer, B-4-Pentenyl-9-BBN

Following the procedure set forth in Example 1, 20 g of 1,4-pentadiene, together with 0.5M, 150 ml of 9-BBN/THF solution, was added to the flask under a nitrogen atmosphere. The mixture was stirred at room temperature for overnight. Excess 1,4-pentadiene and THF were removed by high vacuum. The pure 11 g of B-4-pentenyl-9-BBN was distilled from resultant solution. The molecular structure of monomer was confirmed by means of IR spectroscopy.

EXAMPLE 4

Preparation of Polyborane, Poly-B-7-Octenyl-9-BBN

In a 500 ml flask 0.5 mmole of TiCl$_3$.AA, 3 mmole of Al(Et)$_2$Cl and 64 ml of toluene were added under argon atmosphere. After sufficient mixing, 43 mmole of B-7-octenyl-9-BBN monomer was followed and resulting mixture was mechanically stirred at room temperature. A high viscous polymer gel-like solution was obtained after 3 hours reaction time. The polymerization was then terminated and polymer was precipitated by adding 200 ml of isopropanol. The resulting precipitate was collected by filtration in N$_2$ atmosphere. Additional washing with isopropanol was continued for several times before drying in vacuum for overnight. The overall yield in this Example was 92% with the weight average molecular weight above 3 millions by GPC measurement. The molecular structure of poly-B-7-octenyl-9-BBN was identified by IR spectrum 2,925–2,850 cm$^{-1}$ (C-H stretching), 1,440 cm$^{-1}$ (CH$_2$ bending), 1,370 cm$^{-1}$ (CH$_2$ wagging) and 720 cm$^{-1}$ (CH$_2$ rocking), as well as by "B NMR spectrum resulted from chemical shift $\delta$=88.5 ppm (relative to BF$_3$.OEt$_2$) corresponding to trialkylborane in polymer. The elementary analysis supported the result and showed the C:H:B atomic ratio of 16:29:1.

EXAMPLE 5

Preparation of Polyborane, Poly-B-5-Hexenyl-9-BBN

Following the procedure of Example 4, 5 g of B-5-hexenyl-9-BBN was polymerized in the presence of 0.05 g of TiCl$_3$.AA, 0.26 g of Al(ET)$_2$Cl and 50 ml of toluene. After a period of approximately 3 hours of continuous stirring of the reaction mixture, 50 ml of isopropanol was added to the reaction mixture and the resulting precipitate was filtrated and washed with isopropanol in the nitrogen atmosphere. After drying polymer in vacuum overnight, more than 90% yield was obtained. The IR spectrum of resulting polymer was in good agreement with the molecular structure of poly-B-5-hexenyl-9-BBN.

EXAMPLE 6

Preparation of Polyborane, Poly-B-4-Pentenyl-9-BBN

Following the procedure of Example 4, 6.4 g of B-4-pentenyl-9-BBN was polymerized by Ziegler-Natta catalyst, TiCl$_3$.AA (0.8 g), Al(ET)$_2$Cl of (0.4 g), toluene (50 ml). After stirring the solution for overnight, 50 ml of isopropanol was added to stop reaction. The resulting precipitate was collected by filtration and washed with isopropanol, resulting in 3 g powder.

EXAMPLE 7

Preparation of Poly-octene-8-ol

In the inert atmosphere, 6 g of polyoctene-7-9-BBN was dissolved into 400 ml THF solution. A 5.3 ml (6N) NaOH solution was injected into the reactor, followed by dropwising 10.7 ml, 33% $H_2O_2$ at 0° C. for over 15 minutes. The resulting mixture was then heated up to 50° C. for 3 hours to complete the reaction. After cooling down to room temperature, the polymer was then precipitated from solution by adding 200 ml hexane. Further purification was carried out by redissolving polymer into n-propanol and reprecipitating polymer from petroleum ether. The resultant wet polymer was adhesive to glass and metal. After drying polymer in vacuum oven for 2 days a glassy-like poly-octene-8-ol was obtained.

Infrared spectrum of resulting polymer, summarized in Table 1, confirmed the molecular structure of polyocten-8-ol.

TABLE 1

| Characteristics of the Infrared Spectrum of Poly-octenol | | |
|---|---|---|
| Frequency (cm−1) | Relative Intensity | Assignment |
| 3,300 | Strong | O—H Stretching |
| 2,900 | Strong | C—H Stretching |
| 2,840 | Strong | C—H Stretching |
| 1,440 | Strong | C—H and O—H Bendng |
| 1,370 | Medium | $CH_2$ Wagging |
| 1,050 | Strong | C—O Stretching |
| 720 | Medium | $CH_2$ Rocking |

The polymer was further characterized by $^1H$ NMR spectrum with chemical shift $\delta = 4.4$ ppm for proton in hydroxyl group of polyocten-8-ol. Elementary analysis results (Table 2) was in good agreement with the theoretical value, and confirmed that quantitatively oxidation of polyborane can be achieved as those in organoboranes.

TABLE 2

| Elemental Analysis Results of Polyoctenol | | | | | |
|---|---|---|---|---|---|
| $(C_8H_{16}O)_x$ | C | H | O | B | Total (%) |
| Theoretical Values | 75.0 | 12.5 | 12.5 | 0 | 100 |
| Experimental Values | 74.33 | 13.03 | 12.61 | 0.049 | 100.02 |

EXAMPLE 8

Preparation of Polyhexene-5-ol

Following the procedure of Example 7, 5 g of poly-5-hexenyl-9-BBN in 400 ml of THF was oxidized by 6N, 5 ml of NaOh and 33%, 10 ml of $H_2O_2$ solution. After stirring at 50° C. for 3 hours, the reaction mixture was cooled down to room temperature. The resulting polymer was precipitated from the solution by adding 300 ml of hexane, then was collected by filtration. After washing with methanol, the polymer was dried in vacuum for overnight. The molecular structure of polyhexene-5-ol was characterized by IR intense modes, $\nu_{O-H}$ 3,300 cm$^{-1}$ and $\nu_{C-O}$ 1,050 cm$^{-1}$.

EXAMPLE 9

Thermal Properties of Polyocten-8-ol

The thermogravimetric analysis results of the polymer powder exhibited good thermal stability. In inert atmosphere (e.g. Ar), less than 3% weight loss was observed at 300° C. The decomposition took place about 400° C. and rapidly increased over 500° C. The good thermal stability of polyoctenyl alcohol is quite different from that of polyvinyl alcohol which is dehydrated at about 170° C. and further decomposed above 250° C. The results obviously suggest that the primary alcohol in polyoctenyl alcohol is more stable than secondary alcohol in polyvinyl alcohol. Moreover, the space group between hydroxyl group and polymer backbone is important to delay the decomposition, such as non-catalyzed reverse aldol condensation which happen in polyvinyl alcohol.

In the presence of air, the polymer was stable up to 280° C. without experiencing significant weight loss. Rapid oxidation took place near 480° C. resulting in a large weight loss. At 487° C. the weight loss was near complete, most of the polymer was decomposed in air with very little inorganic impurities left. This was in good agreement with the elementary analysis results, the sum of carbon, hydrogen and oxygen near 100%, in Example 7.

EXAMPLE 10

Molecular Structure of Polyocten-8-ol

Polyocten-8-ol was glassy with partial crystallinity at room temperature. The morphology of polyocten-8-ol is completely different from that of polyoctene which is a viscous gum at room temperature, has not been obtained crystallinity even at low temperature. The x-ray pattern of unoriented polyocten-8-ol is principally characterized by two strong reflections at Brogg angle 2 $\theta = 18°$ and 20° corresponding to spacing (d') of 4.8 Å, and 4.4 Å, and one weak reflection at 2 $\theta = 9.4°$ corresponding to spacing (d') of 9.4 Å. Two reflections at 'd = 4.8 Å and 4.4 Å represent the spacing between parallel side chains, analogous to the reflection maximum on x-ray patterns of amorphous n-paraffins and polyolefins with long side chains, such as polydecene. The d' values of comb-like polymers are quite insensitive to the length of the side chain and fall between 4 and 5 Å. In contrast, the spacing between polymer chains (d'') grows with the increased values of spacing group. The value of d'' can be used to judge the conformation of side chain. The difference between d'' = 9.4 Å for polyoctene-8-ol and (d'' (estimated) = 12 Å) for polyoctene is significant. It may be relative to strong intermolecular interaction resulting from hydrogen bonding.

EXAMPLE 11

The Viscosity of Polyocten-8-ol Solution in n-Propanol

A solution of polyocten-8-ol was prepared in n-propanol at a concentration of 0.5 weight percent. The viscosity of this 0.5 weight percent solution was about 9.1 cp at 1.3 sec$^{-1}$ and at 25° C. After concentrating the solution by blowing nitrogen through the solution, the viscosity of resulting 3 weight percent solution was almost about 170 cp at 1.3 sec$^{-1}$.

What is claimed is:

1. A polyalcohol homopolymer having the formula:

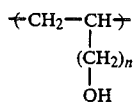

wherein n is about 3 to about 10, wherein said polyalcohol homopolymer has a partial crystalline molecule structure of a syndiotactic configuration and a number average molecular weight of at least 30,000 and said polyalcohol homopolymer has high thermal stability with a major decomposition temperature above 450° C., said polyalcohol homopolymer being formed by reacting a polyborane homopolymer with a NaOH/H$_2$O$_2$ solution of about 0° to about 25° C.

2. A polymeric film having a film thickness of at least 5 μm mils, wherein said polymeric film comprises a polyalcohol homopolymer having the formula:

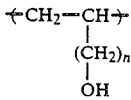

wherein n is about 3 to about 10, wherein said polyalcohol homopolymer has a partial crystalline molecule structure of a syndiotactic configuration and a number average molecular weight of at least 30,000 and said polyalcohol homopolymer has high thermal stability with a major decomposition temperature above 450° C., said polyalcohol homopolymer being formed by reacting a polyborane homopolymer with a NaOH/H$_2$O$_2$ solution of about 0° to about 25° C.

* * * * *